(12) United States Patent
Morris et al.

(10) Patent No.: US 9,758,110 B2
(45) Date of Patent: Sep. 12, 2017

(54) COUPLING SYSTEM

(71) Applicant: GM GLOBAL TECHNOLOGY OPERATIONS LLC, Detroit, MI (US)

(72) Inventors: Steven E. Morris, Fair Haven, MI (US); Jennifer P. Lawall, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 14/594,660

(22) Filed: Jan. 12, 2015

(65) Prior Publication Data

US 2016/0200268 A1 Jul. 14, 2016

(51) Int. Cl.
*G05G 1/12* (2006.01)
*B60R 16/00* (2006.01)
(Continued)

(52) U.S. Cl.
CPC ............. *B60R 16/00* (2013.01); *B60K 35/00* (2013.01); *F16B 2/22* (2013.01); *F16B 11/00* (2013.01);
(Continued)

(58) Field of Classification Search
CPC .. B60R 16/00; F16B 2/22; F16B 11/00; F16B 5/0635; F16B 21/073; B60K 35/00; Y10T 403/7039
(Continued)

(56) References Cited

U.S. PATENT DOCUMENTS

| 471,509 | A | 3/1892 | Duriex |
| 1,219,398 | A | 3/1917 | Huntsman |

(Continued)

FOREIGN PATENT DOCUMENTS

| BE | 842302 A | 9/1976 |
| CN | 1032581 A | 4/1989 |

(Continued)

OTHER PUBLICATIONS

"Coupling Types—Elastic Averaging." MIT. Aug. 3, 2012, [online], [retrieved on Nov. 12, 2014]. Retrieved from the Internet <URL:https://web.archive.org/web/20120308055935/http://pergatory.mit.edu/kinematiccouplings/html/about/elastic_averaging.html>.

(Continued)

*Primary Examiner* — Gregory Binda
*Assistant Examiner* — Nahid Amiri
(74) *Attorney, Agent, or Firm* — Cantor Colburn LLP

(57) ABSTRACT

A coupling system comprises a receiving component, an opening in the receiving component defined by a receiving wall and a mating component, configured to be placed into the opening in the receiving component and comprising a mating wall. A plurality of spaced receiving protrusions extends radially from one of the receiving wall or the mating wall, and are located serially to define a retaining groove. A locating rib is formed on, and extends about, the other of the receiving wall or the mating wall such that the mating component is pressed into the receiving component until the locating rib contacts the receiving protrusions. As additional insertion force is exerted upon the mating component the receiving protrusions yield in a radial direction, allowing the locating rib to enter the retaining groove for retention of the mating component relative to the receiving component.

14 Claims, 2 Drawing Sheets

(51) Int. Cl.
*F16B 2/22* (2006.01)
*F16B 11/00* (2006.01)
*B60K 35/00* (2006.01)
*F16B 21/07* (2006.01)
*F16B 5/06* (2006.01)

(52) U.S. Cl.
CPC .......... *F16B 21/073* (2013.01); *F16B 5/0635* (2013.01); *Y10T 403/7039* (2015.01)

(58) Field of Classification Search
USPC .................................................. 403/361, 372
See application file for complete search history.

(56) References Cited

U.S. PATENT DOCUMENTS

| | | |
|---|---|---|
| 1,261,036 A | 4/1918 | Kerns |
| 1,301,302 A | 4/1919 | Nolan |
| 1,556,233 A | 10/1925 | Maise |
| 1,819,126 A | 8/1931 | Scheibe |
| 1,929,848 A | 10/1933 | Neely |
| 1,968,168 A | 7/1934 | Place |
| 1,982,076 A | 11/1934 | Spahn |
| 1,999,990 A | 4/1935 | Carr |
| 2,006,525 A | 7/1935 | Thal |
| 2,058,319 A | 10/1936 | Jones |
| 2,164,634 A | 7/1939 | Barrett |
| 2,267,558 A | 12/1941 | Birger et al. |
| 2,275,103 A | 3/1942 | Gooch et al. |
| 2,275,900 A | 3/1942 | Hall |
| 2,385,180 A | 9/1945 | Allen |
| 2,482,488 A | 9/1949 | Franc |
| 2,560,530 A | 7/1951 | Burdick |
| 2,612,139 A | 9/1952 | Collins |
| 2,688,894 A | 9/1954 | Modrey |
| 2,693,014 A | 11/1954 | Monahan |
| 2,707,607 A | 5/1955 | O'Connor |
| 2,778,399 A | 1/1957 | Mroz |
| 2,780,128 A | 2/1957 | Rapata |
| 2,788,046 A | 4/1957 | Joseph |
| 2,862,040 A | 11/1958 | Curran |
| 2,902,902 A | 9/1959 | Slone |
| 2,940,149 A | 6/1960 | O'Connor |
| 2,946,612 A | 7/1960 | Ahlgren |
| 2,958,230 A | 11/1960 | Haroldson |
| 3,005,282 A | 10/1961 | Christiansen |
| 3,014,563 A | 12/1961 | Bratton |
| 3,050,160 A | 8/1962 | Chesser |
| 3,087,352 A | 4/1963 | Daniel |
| 3,089,269 A | 5/1963 | McKiernan |
| 3,130,512 A | 4/1964 | Van Buren, Jr. |
| 3,152,376 A | 10/1964 | Boser |
| 3,168,961 A | 2/1965 | Yates |
| 3,169,004 A | 2/1965 | Rapata |
| 3,169,439 A | 2/1965 | Rapata |
| 3,188,731 A | 6/1965 | Sweeney |
| 3,194,292 A | 7/1965 | Borowsky |
| 3,213,189 A | 10/1965 | Mitchell et al. |
| 3,230,592 A | 1/1966 | Hosea |
| 3,233,358 A | 2/1966 | Dehm |
| 3,233,503 A | 2/1966 | Birger |
| 3,244,057 A | 4/1966 | Mathison |
| 3,248,995 A | 5/1966 | Meyer |
| 3,291,495 A | 12/1966 | Liebig |
| 3,310,929 A | 3/1967 | Garvey |
| 3,413,752 A | 12/1968 | Perry |
| 3,473,283 A | 10/1969 | Meyer |
| 3,531,850 A | 10/1970 | Durand |
| 3,551,963 A | 1/1971 | Long |
| 3,580,628 A | 5/1971 | Rantala |
| 3,643,968 A | 2/1972 | Horvath |
| 3,669,484 A | 6/1972 | Bernitz |
| 3,680,272 A | 8/1972 | Meyer |
| 3,733,655 A | 5/1973 | Kolibar |
| 3,800,369 A | 4/1974 | Nikolits |
| 3,838,928 A * | 10/1974 | Blaurock ............... F16C 27/02 403/365 |
| 3,841,044 A | 10/1974 | Brown |
| 3,841,682 A | 10/1974 | Church |
| 3,842,565 A | 10/1974 | Brown et al. |
| 3,845,961 A | 11/1974 | Byrd, III |
| 3,847,492 A | 11/1974 | Kennicutt et al. |
| 3,860,209 A | 1/1975 | Strecker |
| 3,868,804 A | 3/1975 | Tantlinger |
| 3,895,408 A | 7/1975 | Leingang |
| 3,897,967 A | 8/1975 | Barenyl |
| 3,905,570 A | 9/1975 | Nieuwveld |
| 3,962,766 A | 6/1976 | Pompidor et al. |
| 3,967,351 A | 7/1976 | Rosenberg et al. |
| 3,972,550 A | 8/1976 | Boughton |
| 3,988,808 A | 11/1976 | Poe et al. |
| 4,035,874 A | 7/1977 | Liljendahl |
| 4,039,215 A | 8/1977 | Minhinnick |
| 4,042,307 A | 8/1977 | Jarvis |
| 4,043,585 A | 8/1977 | Yamanaka |
| 4,158,511 A | 6/1979 | Herbenar |
| 4,169,297 A | 10/1979 | Weihrauch |
| 4,193,588 A | 3/1980 | Doneaux |
| 4,212,415 A | 7/1980 | Neely |
| 4,213,675 A | 7/1980 | Pilhall |
| 4,237,573 A | 12/1980 | Weihrauch |
| 4,267,680 A | 5/1981 | Delattre |
| 4,286,894 A * | 9/1981 | Rongley ............... F16C 27/04 403/372 |
| 4,300,851 A | 11/1981 | Thelander |
| 4,313,609 A | 2/1982 | Clements |
| 4,314,417 A | 2/1982 | Cain |
| 4,318,208 A | 3/1982 | Borja |
| 4,325,574 A | 4/1982 | Umemoto et al. |
| 4,358,166 A | 11/1982 | Antoine |
| 4,363,839 A | 12/1982 | Watanabe et al. |
| 4,364,150 A | 12/1982 | Remington |
| 4,384,803 A | 5/1983 | Cachia |
| 4,394,853 A | 7/1983 | Lopez-Crevillen et al. |
| 4,406,033 A | 9/1983 | Chisholm et al. |
| 4,407,413 A | 10/1983 | Jansson |
| 4,477,142 A | 10/1984 | Cooper |
| 4,479,737 A | 10/1984 | Bergh et al. |
| 4,481,160 A | 11/1984 | Bree |
| 4,527,760 A | 7/1985 | Salacuse |
| 4,564,232 A | 1/1986 | Fujimori et al. |
| 4,575,060 A | 3/1986 | Kitagawa |
| 4,591,203 A | 5/1986 | Furman |
| 4,599,768 A | 7/1986 | Doyle |
| 4,605,575 A | 8/1986 | Auld et al. |
| 4,616,951 A | 10/1986 | Maatela |
| 4,648,649 A | 3/1987 | Beal |
| 4,654,760 A | 3/1987 | Matheson et al. |
| 4,672,732 A | 6/1987 | Ramspacher |
| 4,745,656 A | 5/1988 | Revlett |
| 4,746,008 A | 5/1988 | Heverly et al. |
| 4,757,655 A | 7/1988 | Jentoft et al. |
| 4,767,647 A | 8/1988 | Bree |
| 4,778,282 A | 10/1988 | Borchardt et al. |
| 4,805,272 A | 2/1989 | Yamaguchi |
| 4,807,335 A | 2/1989 | Candea |
| 4,817,999 A | 4/1989 | Drew |
| 4,819,309 A | 4/1989 | Behymer |
| 4,819,983 A | 4/1989 | Alexander et al. |
| 4,828,423 A * | 5/1989 | Cramer, Jr. ............ F16D 1/0835 403/326 |
| 4,843,975 A | 7/1989 | Welsch |
| 4,843,976 A | 7/1989 | Pigott et al. |
| 4,865,502 A | 9/1989 | Maresch |
| 4,881,764 A | 11/1989 | Takahashi et al. |
| 4,907,582 A | 3/1990 | Meyerrose |
| 4,909,929 A | 3/1990 | Tabor |
| 4,917,426 A | 4/1990 | Copp |
| 4,973,212 A | 11/1990 | Jacobs |
| 4,977,648 A | 12/1990 | Eckerud |
| 5,005,265 A | 4/1991 | Muller |
| 5,007,759 A | 4/1991 | Scherer |
| 5,039,267 A | 8/1991 | Wollar |
| 5,094,580 A | 3/1992 | Abe |

(56) References Cited

U.S. PATENT DOCUMENTS

| | | | |
|---|---|---|---|
| 5,100,015 A | 3/1992 | Vanderstuyf | |
| 5,111,557 A | 5/1992 | Baum | |
| 5,139,285 A | 8/1992 | Lasinski | |
| 5,154,479 A | 10/1992 | Sautter, Jr. | |
| 5,165,749 A | 11/1992 | Sheppard | |
| 5,170,985 A | 12/1992 | Killworth et al. | |
| 5,178,433 A | 1/1993 | Wagner | |
| 5,180,219 A | 1/1993 | Geddie | |
| 5,186,517 A | 2/1993 | Gilmore et al. | |
| 5,208,507 A | 5/1993 | Jung | |
| 5,212,853 A | 5/1993 | Kaneko | |
| 5,234,122 A | 8/1993 | Cherng | |
| 5,250,001 A | 10/1993 | Hansen | |
| 5,297,322 A | 3/1994 | Kraus | |
| 5,309,663 A | 5/1994 | Shirley | |
| 5,333,965 A | 8/1994 | Mailey | |
| 5,339,491 A | 8/1994 | Sims | |
| 5,342,139 A | 8/1994 | Hoffman | |
| 5,348,356 A | 9/1994 | Moulton | |
| 5,368,427 A | 11/1994 | Pfaffinger | |
| 5,368,797 A | 11/1994 | Quentin et al. | |
| 5,397,206 A | 3/1995 | Sihon | |
| 5,407,310 A | 4/1995 | Kassouni | |
| 5,446,965 A | 9/1995 | Makridis | |
| 5,507,610 A | 4/1996 | Benedetti et al. | |
| 5,513,603 A | 5/1996 | Ang et al. | |
| 5,524,786 A | 6/1996 | Skudlarek | |
| 5,538,079 A | 7/1996 | Pawlick | |
| 5,556,808 A | 9/1996 | Williams et al. | |
| 5,566,840 A | 10/1996 | Waldner | |
| 5,575,601 A | 11/1996 | Skufca | |
| 5,577,301 A | 11/1996 | DeMaagd | |
| 5,577,779 A | 11/1996 | Dangel | |
| 5,580,204 A | 12/1996 | Hultman | |
| 5,586,372 A | 12/1996 | Eguchi et al. | |
| 5,593,265 A | 1/1997 | Kizer | |
| 5,601,453 A | 2/1997 | Horchler | |
| 5,629,823 A | 5/1997 | Mizuta | |
| 5,634,757 A | 6/1997 | Schanz | |
| 5,639,140 A | 6/1997 | Labrash | |
| 5,657,516 A | 8/1997 | Berg et al. | |
| 5,657,893 A | 8/1997 | Hitchings | |
| 5,666,749 A | 9/1997 | Waters | |
| 5,667,271 A | 9/1997 | Booth | |
| 5,670,013 A | 9/1997 | Huang et al. | |
| 5,671,513 A | 9/1997 | Kawahara | |
| 5,671,696 A * | 9/1997 | Liethen | A01K 39/012 119/57.8 |
| 5,698,276 A | 12/1997 | Mirabitur | |
| 5,702,779 A | 12/1997 | Siebelink, Jr. et al. | |
| 5,704,753 A | 1/1998 | Ueno | |
| 5,706,559 A | 1/1998 | Oliver | |
| 5,736,221 A | 4/1998 | Hardigg et al. | |
| 5,765,942 A | 6/1998 | Shirai et al. | |
| 5,770,320 A | 6/1998 | Hughes et al. | |
| 5,775,860 A | 7/1998 | Meyer | |
| 5,795,118 A | 8/1998 | Osada et al. | |
| 5,797,170 A | 8/1998 | Akeno | |
| 5,797,714 A | 8/1998 | Oddenino | |
| 5,799,930 A | 9/1998 | Willett | |
| 5,803,646 A | 9/1998 | Weihrauch | |
| 5,806,915 A | 9/1998 | Takabatake | |
| 5,810,535 A | 9/1998 | Fleckenstein et al. | |
| 5,820,292 A | 10/1998 | Fremstad | |
| 5,846,631 A | 12/1998 | Nowosiadly | |
| 5,865,500 A | 2/1999 | Sanada et al. | |
| 5,915,678 A | 6/1999 | Slocum et al. | |
| 5,920,200 A | 7/1999 | Pendse | |
| 5,929,382 A | 7/1999 | Moore | |
| 5,931,514 A | 8/1999 | Chung | |
| 5,934,729 A | 8/1999 | Baack | |
| 5,941,673 A | 8/1999 | Hayakawa et al. | |
| 5,988,678 A | 11/1999 | Nakamura | |
| 6,006,941 A | 12/1999 | Hitchings | |
| 6,010,306 A | 1/2000 | Bucher | |
| 6,036,198 A | 3/2000 | Kramer | |
| 6,062,763 A | 5/2000 | Sirois et al. | |
| 6,073,315 A | 6/2000 | Rasmussen | |
| 6,079,083 A | 6/2000 | Akashi | |
| 6,095,594 A | 8/2000 | Riddle et al. | |
| 6,103,987 A | 8/2000 | Nordquist | |
| 6,109,882 A | 8/2000 | Popov | |
| 6,142,509 A | 11/2000 | White, Jr. et al. | |
| 6,152,436 A | 11/2000 | Sonderegger et al. | |
| 6,164,603 A | 12/2000 | Kawai | |
| 6,193,430 B1 | 2/2001 | Culpepper et al. | |
| 6,199,248 B1 | 3/2001 | Akashi | |
| 6,202,962 B1 | 3/2001 | Snyder | |
| 6,209,175 B1 | 4/2001 | Gershenson | |
| 6,209,178 B1 | 4/2001 | Wiese et al. | |
| 6,213,677 B1 * | 4/2001 | Yamane | A01D 34/905 30/276 |
| 6,237,344 B1 * | 5/2001 | Lee | F01D 5/186 165/908 |
| 6,254,304 B1 | 7/2001 | Takizawa et al. | |
| 6,264,869 B1 | 7/2001 | Notarpietro et al. | |
| 6,283,540 B1 | 9/2001 | Siebelink, Jr. et al. | |
| 6,286,214 B1 | 9/2001 | Bean | |
| 6,289,560 B1 | 9/2001 | Guyot | |
| 6,299,478 B1 | 10/2001 | Jones et al. | |
| 6,311,960 B1 | 11/2001 | Pierman et al. | |
| 6,318,585 B1 | 11/2001 | Asagiri | |
| 6,321,495 B1 | 11/2001 | Oami | |
| 6,324,732 B1 | 12/2001 | Arisaka et al. | |
| 6,336,767 B1 | 1/2002 | Nordquist et al. | |
| 6,345,420 B1 | 2/2002 | Nabeshima | |
| 6,349,904 B1 | 2/2002 | Polad | |
| 6,351,380 B1 | 2/2002 | Curlee | |
| 6,354,574 B1 | 3/2002 | Oliver et al. | |
| 6,354,815 B1 | 3/2002 | Svihla et al. | |
| 6,378,931 B1 | 4/2002 | Kolluri et al. | |
| 6,398,449 B1 | 6/2002 | Loh | |
| 6,470,540 B2 | 10/2002 | Aamodt et al. | |
| 6,478,102 B1 | 11/2002 | Puterbaugh | |
| 6,484,370 B2 | 11/2002 | Kanie et al. | |
| 6,485,241 B1 | 11/2002 | Oxford | |
| 6,498,297 B2 | 12/2002 | Samhammer | |
| 6,523,229 B2 | 2/2003 | Severson | |
| 6,523,817 B1 | 2/2003 | Landry, Jr. | |
| 6,533,391 B1 | 3/2003 | Pan | |
| 6,543,979 B2 | 4/2003 | Iwatsuki | |
| 6,557,260 B1 | 5/2003 | Morris | |
| 6,568,701 B1 | 5/2003 | Burdack et al. | |
| 6,579,397 B1 | 6/2003 | Spain et al. | |
| 6,591,801 B1 | 7/2003 | Fonville | |
| 6,594,861 B2 | 7/2003 | Dimig et al. | |
| 6,609,717 B2 | 8/2003 | Hinson | |
| 6,637,095 B2 | 10/2003 | Stumpf et al. | |
| 6,658,698 B2 | 12/2003 | Chen | |
| 6,662,411 B2 | 12/2003 | Rubenstein | |
| 6,664,470 B2 | 12/2003 | Nagamoto | |
| 6,668,424 B1 | 12/2003 | Allen | |
| 6,677,065 B2 | 1/2004 | Blauer | |
| 6,692,016 B2 | 2/2004 | Yokota | |
| 6,712,329 B2 | 3/2004 | Ishigami et al. | |
| 6,746,172 B2 | 6/2004 | Culpepper | |
| 6,757,942 B2 | 7/2004 | Matsui | |
| 6,799,758 B2 | 10/2004 | Fries | |
| 6,821,091 B2 | 11/2004 | Lee | |
| 6,840,969 B2 | 1/2005 | Kobayashi et al. | |
| 6,846,125 B2 | 1/2005 | Smith et al. | |
| 6,857,676 B2 | 2/2005 | Kawaguchi et al. | |
| 6,857,809 B2 | 2/2005 | Granata | |
| 6,872,053 B2 | 3/2005 | Bucher | |
| 6,895,651 B2 | 5/2005 | Li | |
| 6,908,117 B1 | 6/2005 | Pickett, Jr. et al. | |
| 6,932,416 B2 | 8/2005 | Clauson | |
| 6,948,753 B2 | 9/2005 | Yoshida et al. | |
| 6,951,349 B2 | 10/2005 | Yokota | |
| 6,957,939 B2 | 10/2005 | Wilson | |
| 6,959,954 B2 | 11/2005 | Brandt et al. | |
| 7,055,785 B1 | 6/2006 | Diggle, III | |
| 7,275,772 B2 | 10/2007 | Lee | |
| 7,547,061 B2 | 6/2009 | Horimatsu | |

(56) References Cited

U.S. PATENT DOCUMENTS

| | | | |
|---|---|---|---|
| 7,591,573 B2 | 9/2009 | Maliar et al. | |
| D602,349 S | 10/2009 | Andersson | |
| 7,610,671 B2 * | 11/2009 | Watkins | F16C 27/04 29/525.01 |
| 7,614,836 B2 | 11/2009 | Mohiuddin | |
| 7,727,667 B2 | 6/2010 | Sakurai | |
| 7,883,137 B2 | 2/2011 | Bar | |
| 7,891,926 B2 | 2/2011 | Jackson, Jr. | |
| 7,922,415 B2 | 4/2011 | Rudduck et al. | |
| 7,946,684 B2 | 5/2011 | Drury et al. | |
| 7,959,214 B2 | 6/2011 | Salhoff | |
| 7,971,913 B2 | 7/2011 | Sunahara et al. | |
| 8,029,222 B2 | 10/2011 | Nitsche | |
| 8,061,861 B2 | 11/2011 | Paxton et al. | |
| 8,101,264 B2 | 1/2012 | Pace et al. | |
| 8,136,819 B2 | 3/2012 | Yoshitsune et al. | |
| 8,162,375 B2 | 4/2012 | Gurtatowski et al. | |
| 8,187,369 B2 * | 5/2012 | Rogers | B01D 53/0446 428/141 |
| 8,203,496 B2 | 6/2012 | Miller et al. | |
| 8,203,843 B2 | 6/2012 | Chen | |
| 8,206,029 B2 | 6/2012 | Vaucher et al. | |
| 8,228,640 B2 | 7/2012 | Woodhead et al. | |
| 8,249,679 B2 | 8/2012 | Cui | |
| 8,261,581 B2 | 9/2012 | Cerruti et al. | |
| 8,263,889 B2 | 9/2012 | Takahashi et al. | |
| 8,276,961 B2 | 10/2012 | Kwolek | |
| 8,291,553 B2 | 10/2012 | Moberg | |
| 8,297,137 B2 | 10/2012 | Dole | |
| 8,297,661 B2 | 10/2012 | Proulx et al. | |
| 8,312,887 B2 | 11/2012 | Dunn et al. | |
| 8,328,250 B2 | 12/2012 | Botten et al. | |
| 8,371,788 B2 | 2/2013 | Lange | |
| 8,371,789 B2 | 2/2013 | Takita | |
| 8,414,048 B1 | 4/2013 | Kwolek | |
| 8,424,173 B2 | 4/2013 | Shiba | |
| 8,444,199 B2 | 5/2013 | Takeuchi et al. | |
| 8,474,214 B2 | 7/2013 | Dawe | |
| 8,480,186 B2 | 7/2013 | Wang | |
| 8,511,707 B2 | 8/2013 | Amamori | |
| 8,520,404 B2 | 8/2013 | Hamaguchi | |
| 8,572,818 B2 | 11/2013 | Hofmann | |
| 8,579,141 B2 | 11/2013 | Tejima | |
| 8,607,952 B2 * | 12/2013 | Keating | F16D 13/683 192/112 |
| 8,619,504 B2 | 12/2013 | Wyssbrod | |
| 8,648,264 B2 | 2/2014 | Masumoto | |
| 8,656,563 B2 | 2/2014 | Hiramatsu et al. | |
| 8,677,573 B2 | 3/2014 | Lee | |
| 8,695,201 B2 | 4/2014 | Morris | |
| 8,720,016 B2 | 5/2014 | Beaulieu | |
| 8,726,473 B2 | 5/2014 | Dole | |
| 8,746,801 B2 | 6/2014 | Nakata | |
| 8,756,787 B2 * | 6/2014 | Zimmermann | B23K 26/0081 29/446 |
| 8,773,846 B2 | 7/2014 | Wang | |
| 8,811,004 B2 | 8/2014 | Liu | |
| 8,826,499 B2 | 9/2014 | Tempesta | |
| 8,833,771 B2 | 9/2014 | Lesnau | |
| 8,833,832 B2 | 9/2014 | Whipps | |
| 8,834,058 B2 | 9/2014 | Woicke | |
| 8,905,812 B2 | 12/2014 | Pai-Chen | |
| 8,910,350 B2 | 12/2014 | Poulakis | |
| 9,003,891 B2 | 4/2015 | Frank | |
| 9,038,335 B1 | 5/2015 | Eck | |
| 9,039,318 B2 | 5/2015 | Mantei et al. | |
| 9,050,690 B2 | 6/2015 | Hammer et al. | |
| 9,061,403 B2 | 6/2015 | Colombo et al. | |
| 9,061,715 B2 | 6/2015 | Morris | |
| 9,062,991 B2 | 6/2015 | Kanagaraj | |
| 9,067,625 B2 | 6/2015 | Morris | |
| 9,194,413 B2 | 11/2015 | Christoph | |
| 9,302,569 B2 | 4/2016 | Ogino et al. | |
| 9,303,667 B2 | 4/2016 | Morris et al. | |
| 2003/0059255 A1 | 3/2003 | Kirchen | |
| 2003/0107202 A1 | 6/2003 | Tajima et al. | |
| 2004/0016088 A1 | 1/2004 | Angellotti | |
| 2004/0028503 A1 | 2/2004 | Charles | |
| 2004/0083583 A1 | 5/2004 | Bradley | |
| 2004/0262873 A1 | 12/2004 | Wolf et al. | |
| 2005/0109489 A1 | 5/2005 | Kobayashi | |
| 2005/0191123 A1 | 9/2005 | Wertz | |
| 2005/0208375 A1 | 9/2005 | Sakurai | |
| 2006/0092653 A1 | 5/2006 | Tachiiwa et al. | |
| 2006/0125286 A1 | 6/2006 | Horimatsu et al. | |
| 2006/0163902 A1 | 7/2006 | Engel | |
| 2006/0170242 A1 | 8/2006 | Forrester et al. | |
| 2007/0034636 A1 | 2/2007 | Fukuo | |
| 2007/0137018 A1 | 6/2007 | Aigner et al. | |
| 2007/0205627 A1 | 9/2007 | Ishiguro | |
| 2007/0227942 A1 | 10/2007 | Hirano | |
| 2007/0251055 A1 | 11/2007 | Gerner | |
| 2007/0274777 A1 | 11/2007 | Winkler | |
| 2008/0011930 A1 | 1/2008 | Nagai | |
| 2008/0250609 A1 | 10/2008 | Franks | |
| 2008/0260454 A1 | 10/2008 | Girodo et al. | |
| 2009/0093111 A1 | 4/2009 | Buchwalter et al. | |
| 2009/0117319 A1 * | 5/2009 | Hubert | E02D 31/02 428/77 |
| 2009/0126168 A1 | 5/2009 | Kobe et al. | |
| 2009/0243172 A1 | 10/2009 | Ting et al. | |
| 2009/0309388 A1 | 12/2009 | Ellison | |
| 2009/0318069 A1 | 12/2009 | Konet | |
| 2010/0232171 A1 | 9/2010 | Cannon | |
| 2010/0263417 A1 | 10/2010 | Shoenow | |
| 2010/0307848 A1 | 12/2010 | Hashimoto | |
| 2011/0036542 A1 | 2/2011 | Woicke | |
| 2011/0083392 A1 | 4/2011 | Timko | |
| 2011/0103884 A1 | 5/2011 | Shiomoto et al. | |
| 2011/0154645 A1 | 6/2011 | Morgan | |
| 2011/0183152 A1 | 7/2011 | Lanham | |
| 2011/0194895 A1 * | 8/2011 | Lai | E06B 9/326 403/361 |
| 2012/0000291 A1 | 1/2012 | Christoph | |
| 2012/0112489 A1 | 5/2012 | Okimoto | |
| 2012/0301067 A1 | 11/2012 | Morgan | |
| 2012/0311829 A1 | 12/2012 | Dickinson | |
| 2013/0055822 A1 | 3/2013 | Frank | |
| 2014/0157578 A1 | 6/2014 | Morris | |
| 2014/0260041 A1 | 9/2014 | Peck | |
| 2014/0264206 A1 | 9/2014 | Morris | |
| 2015/0052725 A1 | 2/2015 | Morris et al. | |
| 2015/0056009 A1 | 2/2015 | Morris | |
| 2015/0063943 A1 | 3/2015 | Morris | |
| 2015/0086265 A1 | 3/2015 | Morris | |
| 2015/0093178 A1 | 4/2015 | Morris | |
| 2015/0093179 A1 | 4/2015 | Morris et al. | |
| 2015/0165609 A1 | 6/2015 | Morris et al. | |
| 2015/0165985 A1 | 6/2015 | Morris | |
| 2015/0166124 A1 | 6/2015 | Morris | |
| 2015/0167717 A1 | 6/2015 | Morris | |
| 2015/0174740 A1 | 6/2015 | Morris et al. | |
| 2015/0175091 A1 | 6/2015 | Morris et al. | |
| 2015/0176759 A1 | 6/2015 | Morris et al. | |
| 2015/0192160 A1 | 7/2015 | Gong | |
| 2015/0308534 A1 | 10/2015 | Smith et al. | |
| 2015/0353028 A1 | 12/2015 | Courtin et al. | |

FOREIGN PATENT DOCUMENTS

| | | | |
|---|---|---|---|
| CN | 1036250 A | 10/1989 | |
| CN | 1062629 A | 7/1992 | |
| CN | 1129162 A | 8/1996 | |
| CN | 2285844 Y | 7/1998 | |
| CN | 1205285 A | 1/1999 | |
| CN | 1204744 A | 7/1999 | |
| CN | 2458785 Y | 11/2001 | |
| CN | 1328521 A | 12/2001 | |
| CN | 1426872 A | 7/2003 | |
| CN | 1496451 A | 5/2004 | |
| CN | 2661972 Y | 12/2004 | |
| CN | 2679409 Y | 2/2005 | |
| CN | 1670986 A | 9/2005 | |
| CN | 100573975 C | 9/2005 | |

(56) References Cited

FOREIGN PATENT DOCUMENTS

| | | | |
|---|---|---|---|
| CN | 1693721 A | 11/2005 |
| CN | 2769458 Y | 4/2006 |
| CN | 1771399 A | 5/2006 |
| CN | 1774580 A | 5/2006 |
| CN | 2872795 Y | 2/2007 |
| CN | 2874103 Y | 2/2007 |
| CN | 1933747 A | 3/2007 |
| CN | 2888807 Y | 4/2007 |
| CN | 1961157 A | 5/2007 |
| CN | 1985095 A | 6/2007 |
| CN | 1987033 A | 6/2007 |
| CN | 2915389 Y | 6/2007 |
| CN | 101002030 A | 7/2007 |
| CN | 101005741 A | 7/2007 |
| CN | 200941716 Y | 8/2007 |
| CN | 200957794 Y | 10/2007 |
| CN | 101131173 A | 2/2008 |
| CN | 101250964 A | 8/2008 |
| CN | 101390022 A | 3/2009 |
| CN | 201259846 Y | 6/2009 |
| CN | 201268336 Y | 7/2009 |
| CN | 201310827 Y | 9/2009 |
| CN | 101701595 A | 5/2010 |
| CN | 201540513 U | 8/2010 |
| CN | 101821534 | 9/2010 |
| CN | 101930253 A | 12/2010 |
| CN | 201703439 U | 1/2011 |
| CN | 201737062 U | 2/2011 |
| CN | 201792722 U | 4/2011 |
| CN | 201818606 U | 5/2011 |
| CN | 201890285 U | 7/2011 |
| CN | 102144102 A | 8/2011 |
| CN | 102235402 A | 11/2011 |
| CN | 202024057 U | 11/2011 |
| CN | 202079532 U | 12/2011 |
| CN | 102313952 A | 1/2012 |
| CN | 202132326 U | 2/2012 |
| CN | 202132326 U | 2/2012 |
| CN | 102463882 A | 5/2012 |
| CN | 102540855 A | 7/2012 |
| CN | 102756633 | 10/2012 |
| CN | 102803753 A | 11/2012 |
| CN | 202561269 U | 11/2012 |
| CN | 102817892 A | 12/2012 |
| CN | 102869891 A | 1/2013 |
| CN | 102904128 A | 1/2013 |
| CN | 202686206 U | 1/2013 |
| CN | 102918315 A | 2/2013 |
| CN | 102939022 A | 2/2013 |
| CN | 202764872 U | 3/2013 |
| CN | 103108681 A | 5/2013 |
| CN | 202987018 U | 6/2013 |
| CN | 103201525 A | 7/2013 |
| CN | 103206595 A | 7/2013 |
| CN | 103206596 A | 7/2013 |
| CN | 203189459 U | 9/2013 |
| CN | 203344856 U | 12/2013 |
| CN | 103567916 A | 2/2014 |
| CN | 103586684 A | 2/2014 |
| CN | 103586685 A | 2/2014 |
| CN | 103591102 A | 2/2014 |
| CN | 104100609 A | 10/2014 |
| CN | 203991175 U | 12/2014 |
| DE | 1220673 B | 7/1966 |
| DE | 2527023 A1 | 12/1976 |
| DE | 2736012 A1 | 2/1978 |
| DE | 2703897 A1 | 8/1978 |
| DE | 2809746 A1 | 9/1979 |
| DE | 3008990 A1 | 9/1980 |
| DE | 3704190 A1 | 12/1987 |
| DE | 3711696 A1 | 10/1988 |
| DE | 3805693 A1 | 2/1989 |
| DE | 3815927 | 11/1989 |
| DE | 9109276 U1 | 7/1991 |
| DE | 4002443 A1 | 8/1991 |
| DE | 4111245 A1 | 10/1991 |
| DE | 9201258 U1 | 3/1992 |
| DE | 29714892 U1 | 10/1997 |
| DE | 29800379 U1 | 5/1998 |
| DE | 69600357 T2 | 12/1998 |
| DE | 10003852 A1 | 8/2001 |
| DE | 10202644 C1 | 6/2003 |
| DE | 10234253 B3 | 4/2004 |
| DE | 10333540 A1 | 2/2005 |
| DE | 60105817 T2 | 2/2006 |
| DE | 202007006175 U1 | 8/2007 |
| DE | 102008005618 A1 | 7/2009 |
| DE | 102008063920 A1 | 9/2009 |
| DE | 102008047464 A1 | 4/2010 |
| DE | 102010028323 A1 | 11/2011 |
| DE | 102010026218 A1 | 1/2012 |
| DE | 102011050003 A1 | 10/2012 |
| DE | 102012212101 B3 | 7/2013 |
| DE | 102013003028 A1 | 3/2014 |
| EP | 0118796 | 9/1984 |
| EP | 0616140 A2 | 9/1994 |
| EP | 1132263 A1 | 9/2001 |
| EP | 1243471 A2 | 9/2002 |
| EP | 1273766 A1 | 1/2003 |
| EP | 1293384 A2 | 3/2003 |
| EP | 1384536 A2 | 1/2004 |
| EP | 1388449 A1 | 2/2004 |
| EP | 1452745 A1 | 9/2004 |
| EP | 1550818 A1 | 7/2005 |
| EP | 2166235 A2 | 3/2010 |
| EP | 2450259 A1 | 5/2012 |
| EP | 2458454 A1 | 5/2012 |
| FR | 1369198 A | 8/1964 |
| FR | 2009941 A | 2/1970 |
| FR | 2750177 A2 | 12/1997 |
| FR | 2942749 A1 | 9/2010 |
| FR | 2958696 A1 | 10/2011 |
| GB | 155838 | 3/1922 |
| GB | 994891 | 6/1965 |
| GB | 2175626 A | 12/1986 |
| GB | 2281950 A | 3/1995 |
| GB | 2348924 A | 10/2000 |
| JP | S6054264 A | 3/1985 |
| JP | -10861318 A | 3/1996 |
| JP | H08200420 A | 8/1996 |
| JP | H0942233 A | 2/1997 |
| JP | 2000010514 A | 1/2000 |
| JP | 2000192924 A | 7/2000 |
| JP | 2000287717 A | 10/2000 |
| JP | 2001141154 A | 5/2001 |
| JP | 2001171554 A | 6/2001 |
| JP | 2003158387 A | 5/2003 |
| JP | 2003314515 A | 11/2003 |
| JP | 2005268004 | 9/2005 |
| JP | 2006205918 | 8/2006 |
| JP | 2008307938 A | 12/2008 |
| JP | 2009084844 | 4/2009 |
| JP | 2009187789 A | 8/2009 |
| JP | 2010266519 A | 11/2010 |
| JP | 2011085174 A | 4/2011 |
| JP | 2012060791 A | 3/2012 |
| JP | 2012112533 A | 6/2012 |
| JP | 2012126421 A | 7/2012 |
| KR | 20030000251 A1 | 1/2003 |
| KR | 100931019 B1 | 12/2009 |
| WO | 9602963 A1 | 2/1996 |
| WO | 9822739 A1 | 5/1998 |
| WO | 0055517 A2 | 3/2000 |
| WO | 0132454 A3 | 11/2001 |
| WO | 2004010011 | 1/2004 |
| WO | 2007126201 A1 | 11/2007 |
| WO | 2008140659 A1 | 11/2008 |
| WO | 2010105354 A1 | 9/2010 |
| WO | 2011025606 | 3/2011 |
| WO | 2013088447 A1 | 6/2013 |
| WO | 2013191622 A1 | 12/2013 |

(56) References Cited

FOREIGN PATENT DOCUMENTS

| WO | 2014062144 A1 | 4/2014 |
|---|---|---|
| WO | 2014119366 A1 | 8/2014 |

OTHER PUBLICATIONS

"Passive Alignment of Micro-Fluidic Chips Using the Principle of Elastic Averaging" by Sitanshu Gurung, Thesis, Louisiana State University, Dept. of Mechnical engineering, Dec. 2007.

"Precision Connector Assembly Using Elastic Averaging" by Patrick J. Willoughby and Alexander H. Slocum, Massachusetts Institute of Technology (MIT), Cambridge, MA, American Society for Precision Engineering, 2004.

"The Design of High Precision Parallel Mechanisms Using Binary Actuation and Elastic Averaging: With Application to MRI Cancer Treatment" by L.M. Devita, J.S. Plante, and S. Dubowsky, 12th IFToMM World Congress (France), Jun. 2007.

Awtar, S., et al., "Elastic Averaging in Flexure Mechanisms: A Multi-Beam Paralleaogram Flexture Case-Study", Proceedings of IDETC/CIE 2006, Paper DETC2006-99752, American Society of Mechanical Engineers (ASME), Sep. 2006; 7 pgs.

Balasubramaniam, M., et al.,"An Anti Backlash Two-Part Shaft Coupling With Interlocking Elastically Averaged Teeth" Precision Engineering, V. 26, No. 3, Elsevier Publishing, Jul. 2002; 28 pages.

Cross-sectional view of a prior art infrared welded assembly of BMW, Munich, Germany. Believed on the market since about Jan. 1, 2010, 1 page.

Rojas, F.E., et al., "Kinematic Coupling for Precision Fixturing & Assembly" MIT Precision Engineering Research Group, Apr. 2013; 24 pgs.

Slocum, A.H., et al., "Kinematic and Elastically Averaged Joints: Connecting the Past, Present and Future" International Symposium on Ultraprecision Engineering and Nanotechnology, Tokyo, Japan, Mar. 13, 2013; 4 pgs.

Willoughby, P., "Elastically Averaged Precision Alignment", Degree of Doctor of Philosophy in Mechanical Engineering Dissertation, Massachusetts Institute of Technology, 2005; 158 pgs.

* cited by examiner ns and, more specifically, to matable vehicle components.

COUPLING SYSTEM

FIELD OF THE INVENTION

The subject invention relates to matable components and, more specifically, to matable vehicle components.

BACKGROUND

Components, in particular vehicular components used in automotive vehicles, may be coupled to each other with one or more fasteners such as screws or nuts and bolts. However, the use of fastener systems results in increased parts, increased cost, increased assembly time, and may lead to relative motion between the components and fasteners, which can cause misalignment between components and undesirable noise such as squeaking and rattling.

SUMMARY OF THE INVENTION

In an embodiment a coupling system comprises a receiving component, an opening in the receiving component defined by a receiving wall and a plurality of spaced receiving protrusions extending radially inwardly from the receiving wall and located serially about the receiving wall to define a retaining groove. A mating component is configured to be placed into the opening in the receiving component and comprises a mating wall and a locating rib formed on and extending about the mating wall such that the mating component is pressed into the receiving component until the locating rib contacts the receiving protrusions and, as additional insertion force is exerted upon the mating component, the receiving protrusions yield in an outwardly radial direction, allowing the locating rib to enter the retaining groove for retention of the mating component relative to the receiving component.

In another embodiment a coupling system comprises a receiving component, an opening in the receiving component defined by a receiving wall and a mating component, configured to be placed into the opening in the receiving component and comprising a mating wall. A plurality of spaced receiving protrusions extends radially from the one of the receiving wall or the mating wall and are located serially to define a retaining groove. A locating rib is formed on, and extends about, the other of the one of the receiving wall or the mating wall such that the mating component is pressed into the receiving component until the locating rib contacts the receiving protrusions and as additional insertion force is exerted upon the mating component the receiving protrusions yield in a radial direction, allowing the locating rib to enter the retaining groove for retention of the mating component relative to the receiving component.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
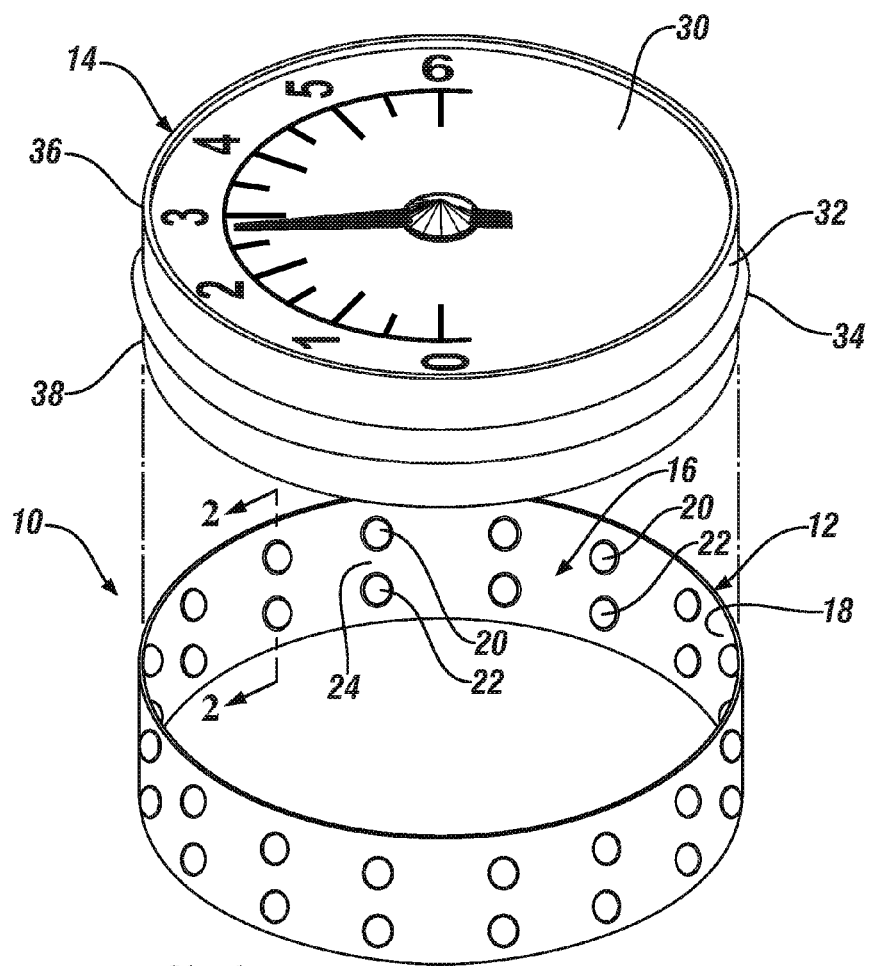
FIG. 1 is a disassembled perspective view of a coupling system embodying features of the invention.

The following description is merely exemplary in nature and is not intended to limit the present disclosure, its application or uses. For example, the embodiments shown are applicable to vehicle components, but the system disclosed herein may be used with any suitable components to provide securement and retention of mating components and component applications, including many industrial, consumer product (e.g., consumer electronics, various appliances and the like), transportation, energy and aerospace applications, and particularly including many other types of vehicular components and applications, such as various interior, exterior, electrical and under-hood vehicular components and applications. It should be understood that throughout the drawings, corresponding reference numerals indicate like or corresponding parts and features.

Any suitable material may be used for the mating components and their features disclosed herein and discussed further below. This includes various metals, polymers, ceramics, inorganic materials or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends.

As used herein, the term vehicle is not limited to just an automobile, truck, van or sport utility vehicle, but includes any self-propelled or towed conveyance suitable for transporting a burden.

Figure 2:
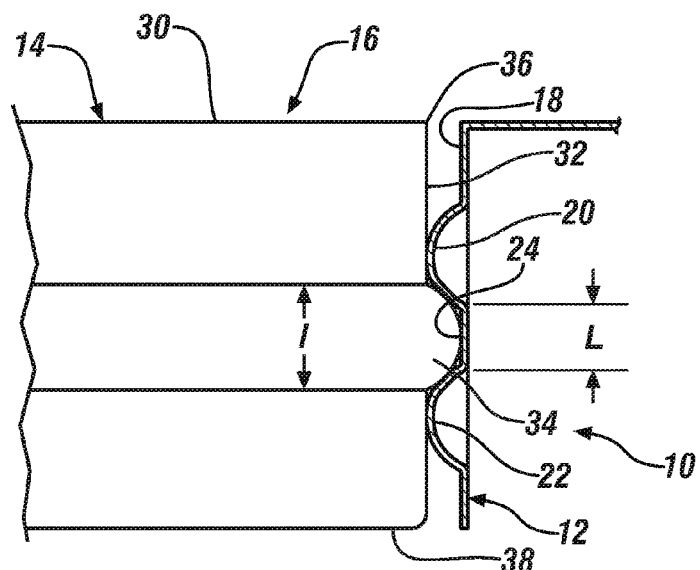
FIG. 2 is a cross section taken along Line 2-2 of FIG. 1 of the assembled coupling system.

Referring to FIGS. 1 and 2, in an exemplary embodiment, a coupling system 10 is illustrated. The coupling system comprises a first, receiving component 12 such as an instrument cluster and a second, mating component 14 such as an instrument or gage to be located in the instrument cluster. The receiving component includes an opening 16 in which the mating component 14 will be fixedly inserted during assembly thereof. The opening is defined by a receiving wall 18 extending inwardly from and about the opening 16. Located serially about the receiving wall 18 are a plurality of circumferentially spaced receiving protrusions 20 that extend radially inwardly from the receiving wall. The receiving protrusions 20 are constructed to have a degree of flexibility and, therefore, may be hollow as well as being constructed of a flexible material that will deform elastically when a force is applied thereto in an outwardly radial direction. Axially spaced from the receiving protrusions 20, a plurality of circumferentially spaced locating protrusions 22 are located serially about the receiving wall 18 and extend radially inwardly from the receiving wall. The receiving protrusions 20 are constructed to have a degree of flexibility and, therefore, may be hollow as well as being constructed of a flexible material that will deform elastically when a force is applied thereto in an outwardly radial direction. The receiving protrusions 20 and the locating protrusions 22 on the receiving wall 18 define an axial space therebetween referred to as a retaining groove 24.

The mating component 14 has external dimensions that allow it to be placed into the opening 16 of the receiving component 12. The mating component may include a face 30, in the case of a gage, and a mating wall 32 extending therefrom. The circumference or perimeter of the mating wall 32 is configured to fit with a predetermined spacing from the receiving wall 18 when the components are mated. A locating rib 34 is formed on and extends circumferentially about the mating wall 32 intermediate of a first end 36 and a second end 38 thereof. The locating rib 34 extends radially outwardly from the mating wall 32 and is configured to fit closely with that of the receiving wall 18 when the components are mated; but not in an interference fit. Additionally, in an embodiment, the axial length "l" of the locating rib 34 is greater than the axial length "L" of the retaining groove 24; in an interference fit.

Assembly of the mating component 14 into the receiving component 12 comprises inserting the second end 38 of the receiving component into the opening 16 of the mating component 14. The mating component is pressed into the receiving component until the locating rib 34 contacts the series of receiving protrusions 20 extending about the inner circumference of the receiving wall 18. As additional insertion force is exerted upon the mating component 14, the receiving protrusions 20 yield in an outwardly radial direction, allowing the locating rib 34 to enter the retaining groove 24. As illustrated in FIG. 2, in an embodiment, the retaining groove 24 has an axial length "L" that is less than the axial length "l" of the locating rib 34. As such, when the locating rib is positioned in the retaining groove 24, the receiving protrusions 20 and the axially spaced locating protrusions 22 remain partially elastically deformed in the outwardly radial direction by the presence of the locating rib 34. The result is a snug, elastically averaged precision fit of the mating component 14 within the opening 16 of the receiving component 12 in multiple directions (i.e. cross-car, fore/aft and up/down).

Figure 3:
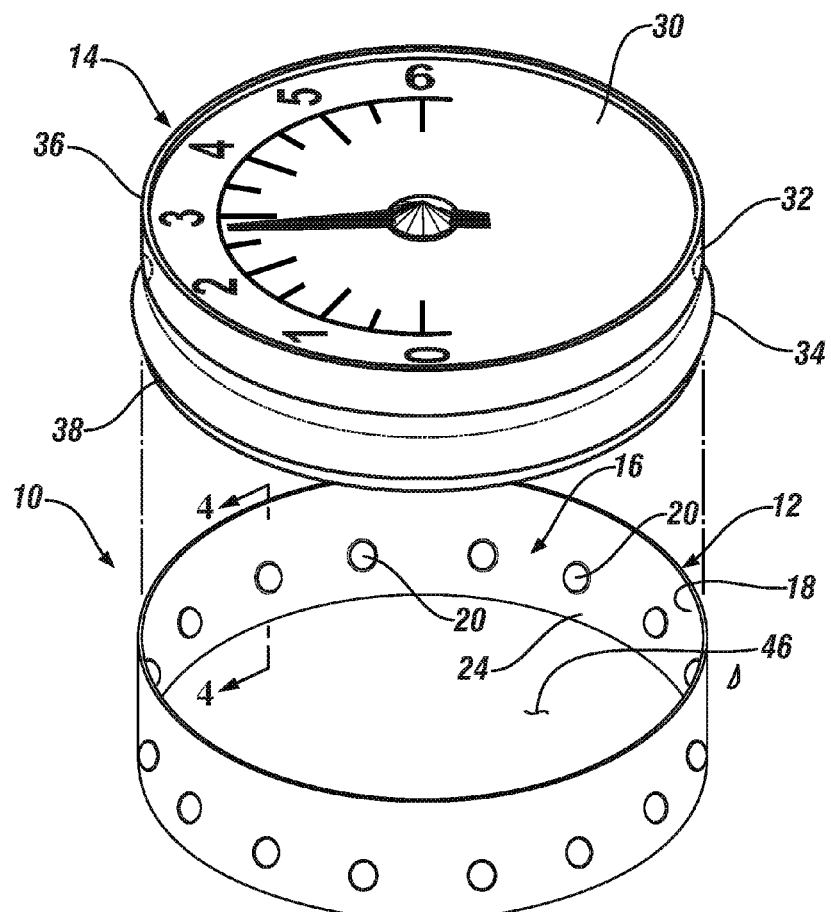
FIG. 3 is a disassembled perspective view of another embodiment of a coupling system embodying features of the invention.
Figure 4:
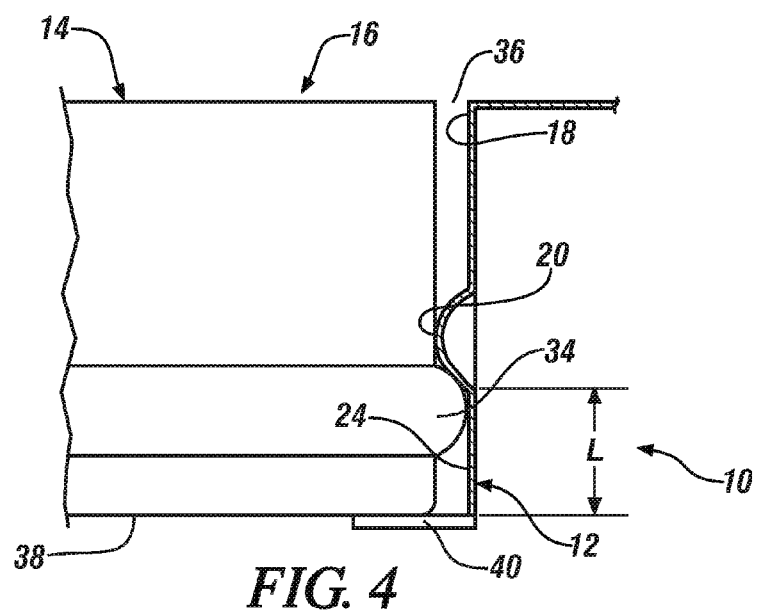
FIG. 4 is a cross section taken along Line 4-4 of FIG. 3 of the assembled coupling system.

Referring to FIGS. 3 and 4, in an alternative embodiment, a coupling system 10 is illustrated. The coupling system comprises a first, receiving component 12 such as an instrument cluster and a second, mating component 14 such as an instrument or gage to be located in the instrument cluster. The receiving component includes an opening 16 in which the mating component 14 will be fixedly inserted during assembly thereof. The opening is defined by a receiving wall 18 extending inwardly from and about the opening 16. Located serially about the receiving wall 18 are a plurality of circumferentially spaced receiving protrusions 20 that extend radially inwardly from the receiving wall. The receiving protrusions 20 are constructed to have a degree of flexibility and, therefore, may be hollow as well as being constructed of a flexible material that will deform elastically when a force is applied thereto in an outwardly radial direction. Axially spaced from the receiving protrusions 20, at least one stop member 40 extends radially inwardly from the receiving wall. The stop member 40 may be constructed such that it is configured as an inwardly extending tab 44, FIG. 4, may be the closed bottom 46 of the opening 16 in the receiving component 12 or may comprise a plurality of rigid spaced locating protrusions 22 located serially about the receiving wall 18. The receiving protrusions 20 and the stop member 40 define an axial space therebetween, referred to as a retaining groove 24.

Assembly of the mating component 14 into the receiving component 12 comprises inserting the second end 38 of the mating component 14 into the opening 16 of the receiving component 12. The mating component is pressed into the receiving component until the locating rib 34 contacts the series of receiving protrusions 20 that extend about the inner circumference or perimeter of the receiving wall 18. As additional insertion force is exerted upon the mating component 14, the receiving protrusions 20 yield in an outwardly radial direction, allowing the locating rib 34 to enter the retaining groove 24. As illustrated in FIG. 4, in an embodiment, the retaining groove 24 has an axial length "L" such that an interference fit in the axial direction is established between the locating rib 34 and the series of receiving protrusions 20 when the second end 38 of the mating component contacts the stop member 40. The result is a snug, elastically averaged precision fit of the mating component 14 within the opening 16 of the receiving component 12 in multiple directions (i.e. cross-car, fore/aft and up/down).

It is contemplated that the invention has applications to assemblies of virtually any configuration such as, for instance, square, rectangular, etc. Such configurations may be expected to be used in applications such as storage bins and housings, for instance. Additionally, in the examples described above the receiving and locating protrusions 20 and 22 are placed about the circumference of the receiving component while the locating rib 34 extends about the mating wall 32 of the mating component 14. It is contemplated that the locations of the protrusions and the rib may be reversed with the protrusions being located on the mating component 14 and the locating rib 34 extending about the receiving component. In an embodiment, it is contemplated that the number of locating ribs 34 may be greater than a single rib as described thus far herein. Multiple locating ribs may be utilized to trap a series of locating protrusions, for example, in a contemplated embodiment.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed, but that the invention will include all embodiments falling within the scope of the application.

What is claimed is:
1. A coupling system comprising:
a receiving component;
an opening in the receiving component defined by a receiving wall;
a plurality of spaced receiving protrusions extending radially inwardly from the receiving wall and located serially about the receiving wall;
a plurality of spaced locating protrusions, axially spaced from the receiving protrusions extending radially inwardly from the receiving wall and located serially about the receiving wall, the plurality of spaced receiving protrusions and the plurality of locating protrusions define a retaining groove, the retaining groove having an axial length (L) that is less than the axial length (l) of the locating rib; and a mating component, configured to be placed into the opening in the receiving component, comprising a mating wall and a locating rib formed on and extending about the mating wall configured for elastic retention in the retaining groove such that the mating component is pressed into the receiving component until the locating rib contacts the receiving protrusions and, as additional insertion force is exerted upon the mating component the receiving protrusions yield in an outwardly radial direction, allowing the locating rib to enter the retaining groove for retention of the mating component relative to the receiving component.

2. The coupling system of claim 1, wherein the receiving protrusions are hollow.

3. The coupling system of claim 2, wherein one or both of the receiving protrusions and the locating protrusions are partially elastically deformed in the outwardly radial direction by the locating rib.

4. The coupling system of claim 1, further comprising at least one stop member, axially spaced from the receiving protrusions and extending radially inwardly from the receiving wall to define the retaining groove with the receiving protrusions.

5. The coupling system of claim 4, the stop member configured as an inwardly extending tab.

6. The coupling system of claim 4, the stop member comprising a closed bottom of the opening in the receiving component.

7. The coupling system of claim 4, the stop member comprising a plurality of rigid spaced locating protrusions located serially about the receiving wall.

8. The coupling system of claim 4, the retaining groove having an axial length "L" such that an interference fit in the axial direction is established between the locating rib and the series of receiving protrusions when the mating component contacts the stop member.

9. A coupling system comprising:
a receiving component;
an opening in the receiving component defined by a receiving wall;
a mating component, configured to be placed into the opening in the receiving component, comprising a mating wall;
a plurality of spaced receiving protrusions extending radially from the one of the receiving wall or the mating wall and located serially to define a retaining groove; and
a locating rib formed on and extending about the other of the one of the receiving wall or the mating wall configured for elastic retention in the retaining groove such that the mating component is pressed into the receiving component until the locating rib contacts the receiving protrusions and as additional insertion force is exerted upon the mating component the receiving protrusions yield in a radial direction, allowing the locating rib to enter the retaining groove for retention of the mating component relative to the receiving component,
wherein the retaining groove has an axial length (L) that is less than the axial length (l) of the locating rib.

10. The coupling system of claim 9, wherein the receiving protrusions are hollow.

11. The coupling system of claim 9, further comprising a plurality of spaced locating protrusions, axially spaced from the receiving protrusions extending radially from the one of the receiving wall or the mating wall to define the retaining groove with the receiving protrusions.

12. The coupling system of claim 11, one or both of the receiving protrusions and the locating protrusions are partially elastically deformed in the radial direction by the locating rib.

13. The coupling system of claim 9, further comprising at least one stop member, axially spaced from the receiving protrusions and extending radially from the receiving wall to define the retaining groove with the receiving protrusions.

14. The coupling system of claim 13, the stop member comprising a plurality of rigid spaced locating protrusions located serially about the receiving wall.

\* \* \* \* \*